United States Patent
Seidel et al.

(10) Patent No.: US 6,658,005 B2
(45) Date of Patent: Dec. 2, 2003

(54) HYBRID ARQ METHOD FOR PACKET DATA TRANSMISSION

(75) Inventors: Eiko Seidel, Langen (DE); Thomas Wiebke, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 258 days.

(21) Appl. No.: 09/858,590

(22) Filed: May 17, 2001

(65) Prior Publication Data

US 2001/0055290 A1 Dec. 27, 2001

(30) Foreign Application Priority Data

May 17, 2000 (EP) .............................................. 00110551

(51) Int. Cl.⁷ ................................................. H04L 1/18
(52) U.S. Cl. ........................ 370/394; 370/524; 714/748
(58) Field of Search ................................ 370/394, 524, 370/465, 342, 473, 337; 714/748, 751

(56) References Cited

U.S. PATENT DOCUMENTS

| | | | | |
|---|---|---|---|---|
| 4,999,834 A | * | 3/1991 | Leo et al. ..................... | 370/241 |
| 6,317,430 B1 | * | 11/2001 | Knisely et al. ............... | 370/394 |
| 6,359,877 B1 | * | 3/2002 | Rathonyi et al. ............ | 370/349 |
| 6,367,045 B1 | * | 4/2002 | Khan et al. .................. | 714/748 |
| 6,498,936 B1 | * | 12/2002 | Raith ........................... | 455/466 |

FOREIGN PATENT DOCUMENTS

| | | |
|---|---|---|
| EP | 0981221 A2 | 2/2000 |
| EP | 0996248 A1 | 4/2000 |
| JP | 2000-196673 | 7/2000 |
| WO | 00/02326 | 1/2000 |
| WO | 00/08796 | 2/2000 |

OTHER PUBLICATIONS

Miller et al. "Automatic Repeat Request Error Control Schemes" IEEE Communicaitons Magazine, vol. 22, No. 12, Dec. 1987, pp. 5–5–17–17.

* cited by examiner

*Primary Examiner*—Min Jung
(74) *Attorney, Agent, or Firm*—Wenderoth, Lind & Ponack, L.L.P.

(57) ABSTRACT

A hybrid ARQ method for packet data transmission in a mobile communication system wherein previously transmitted packets are combined with retransmitted packets, said packets being segmented into a plurality of protocol data units PDUs, each being assigned a sequence number for identification purposes. According to the invention the sequence number is transmitted on a control channel which is separate from the data channel for transmitting the PDUs.

26 Claims, 3 Drawing Sheets

HYBRID ARQ METHOD FOR PACKET DATA TRANSMISSION

The present invention relates to retransmission techniques in mobile communication systems, in particular CDMA systems and more specifically to a hybrid ARQ (automatic retransmission request) method for packet data transmission that combines previously transmitted packets with retransmitted packets. With each combining operation, redundancy is increased and the packet is more likely to be received correctly even in hostile communication environments.

In more detail, the present invention relates to a hybrid ARQ method according to the preamble part of claim 1. This method is commonly referred to in the art as hybrid ARQ type II or III or incremental redundancy.

A common technique for error detection of non-real time services is based on Automatic Repeat request (ARQ) schemes which are combined with Forward Error Correction (FEC), called hybrid ARQ. If an error is detected by Cyclic Redundancy Check (CRC), the receiver requests the transmitter to send additional bits of data.

From different existing schemes the selective-repeat continuous ARQ is most often used in mobile communications. This scheme in connection with FEC will be used for next generation mobile communication systems such as UMTS. A retransmission unit of the RLC (Radio Link Control) layer is referred to as PDU (Protocol Data Unit).

In the art, commonly three different types of ARQ are defined as specified below. Examples of corresponding prior art documents are:

*Performance of punctured channel codes with ARQ for multimedia transmission* in *Rayleigh fading channels*; Lou, H. and Cheung, A. S.; 46th. IEEE Vehicle Technology Conference, 1996;

*Analysis of a type II hybrid ARQ scheme with code combining*, S. Kallel, IEEE Transactions on Communications, Vol.38#8, Aug. 1990; and

*Throughput performance of Memory ARQ schemes*, S. Kallel, R. Link, S. Bakhtiyari, IEEE Transactions on Vehicular Technology, Vol.48#3, May 1999.

Type I: The erroneous PDUs are discarded and a new copy of that PDU is retransmitted and decoded separately. There is no combining of earlier and later versions of that PDU.

Type II: The erroneous PDU that needs to be retransmitted is not discarded, but is combined with some incremental redundancy bits provided by the transmitter for subsequent decoding. Retransmitted PDUs sometimes have higher coding rates and are combined at the receiver with the stored values. That means that only little redundancy is added in each retransmission.

Type III: Is the same as Type II with the only difference that every retransmitted PDU is now self-decodable. This implies that the PDU is decodable without the need of forming a combination with previous PDUs. This is useful if some PDUs are so heavily damaged that almost no information is reusable.

Schemes of type II and III are obviously more intelligent and show some performance gain, because they have the ability to adjust the coding rate to changing radio environments and to reuse redundancy of previously transmitted PDUs.

To support incremental redundancy the sequence number SN of the transmission unit has to be encoded separately. The stored data with the known SN can then be combined with subsequent retransmissions.

In prior art the SN is encoded in the PDU header or in the time slot header (e.g. EPA-0938207) and transmitted together with the PDU. If the PDU is corrupted it is likely that also the header is destroyed. Therefore the coding has to be done with a lower coding rate to allow the SN to be read even when the data is erroneous. That means that there will be a large coding overhead to ensure reliable transmission of the sequence number. The coding for the SN therefore has to be different from that used for the PDUs resulting into increased complexity. To ensure that the SN is correct a CRC parity check could be applied, but reliable CRC over few bits is not very efficient.

Besides the signalling overhead that is introduced by the prior art methods it is the implementation complexity that has prevented this technique from being used. A large amount of memory is required in the receiver to store the erroneous packets for combining with the retransmissions. Since the SNs are not known before receiving the retransmission it is not possible to start the combining process before the SNs have been decoded.

The object underlying the present invention is to provide a hybrid ARQ method with less signalling overhead and low implementation complexity.

This object is solved by a hybrid ARQ method as set forth in claim 1.

The present invention overcomes the prior art problems since the sequence number is transmitted over a separate control channel. This allows that the complexity of the receiver is decreased since the sequence number may be transmitted beforehand which allows a more efficient decoding and combining of the PDUs which may follow at a later time. Instead of storing the complete frame, decoding the SNs, combining stored packets with now identified retransmitted packets and finally decoding the packets, only combining and decoding needs to be done. Furthermore, delivery of the SNs on a separate channel easies the introduction of this method into existing systems, since the PDU format and the complete mapping function in the medium access control MAC layer can be left unchanged compared to a retransmission scheme not using type II/III combining.

According to preferred embodiments, different channelisation codes, different time slots and different frequencies are used for the control channel for transmitting the sequence numbers and the data channel for transmitting the PDUs. This provides for additional performance gain obtained due to time and frequency diversity and separate physical channels of the PDU and the SN.

Preferably, the data channel for transmitting the PDUs is a channel shared by several users which allows more efficient use of the channel resources.

According to a preferred embodiment, the control channel for transmitting the SNs is a low rate dedicated channel or a shared control channel in order to save channel resources.

According to a further advantageous embodiment, the quality of service QoS of the control channel is independent from the QoS of the data channel for transmitting the PDUs by suitably controlling at least one of the parameters transmission power, coding rate and spreading factor. Consequently, transmission efficiency as well as reliable transmission of the sequence number is attained by separately controlling the QoS for the SN and the PDU.

For higher data rates, it is advantageous to combine multiple sequence numbers in a sequence number data unit SNDU in order to compress the signalling and to increase CRC efficiency. Preferably, the SNDU is multiplexed with other signalling data or user data to save channel resources. According to a further preferred embodiment the SNDU is sent together with an allocation message on the control channel for a shared uplink or downlink channel transmitting with a high data rate.

Depending on the used physical channel and the access technology, the reception of SNs and the PDUs are either not or less correlated with respect to time. Although it is advantageous that the SNs of the SNDU arrive in the order of the received PDUs, the high rate packet transmissions are less time constrained and allow for a time offset between the SN and the corresponding PDU.

According to a further preferred embodiment, the SNDU is mapped to more than one frame of the control channel which allows interleaving.

Further, it is preferred, that correct reception of a SNDU is indicated from the mobile station to the base station or vice versa as part of a transmission protocol.

If the sequence number is additionally included in the header of each PDU, type III ARQ can be realised.

According to a further advantageous embodiment of the invention, the method includes that a network control unit transmits a signal whether the hybrid ARQ method is to be employed or not. Alternatively, the signal can be transmitted from the mobile or base station. As a variant, the base station and/or the mobile station can recognise from the existence of a SNDU whether the hybrid ARQ method is to be employed or not.

The present invention will now be described in more detail with reference to the accompanying figures, in which FIG. 1 shows a frame and slot structure of an DCH frame to which the present invention may be applied;

Next generation mobile communication systems such as UMTS will provide the capabilities to transmit variable bit rate packet transmission. Traffic characteristics can be very bursty and need a fast channel allocation strategy. One example for a fast allocation scheme is the use of a shared channel, where a high rate packet channel is only allocated to users actually having data to transmit. Thus, idle times of a high rate dedicated channels are minimised. In WO-A-00/02326 an example for a shared channel concept is given. The invention can advantageously be used with a high rate shared channel.

The built up of a dedicated channel DCH as a permanent resource is not very efficient to support packet traffic, since the establishment of a DCH will take considerable time. For CDMA communication systems using orthogonal codes also the available code resource is limited. The use of a downlink shared channel DSCH with fast resource allocation is seen important as for packet data the data stream could have high peak rates but low activity cycles.

In the following the invention shall be described by way of an example only in connection with a downlink shared channel called DSCH. When a shared channel is used, the spreading codes for high rate code users are allocated frame by frame. There will be a signalling channel for allocation messages in parallel to the DSCH. This could be a shared control channel or a low rate associated channel. In the described example a low rate dedicated channel DCH is allocated to each user to maintain CDMA power control and to inform the mobile station when there is data on the shared channel to decode. The DCH will be allocated a high spreading factor code (e.g. SF=256), but still represent a considerably large overhead.

Figure 1:
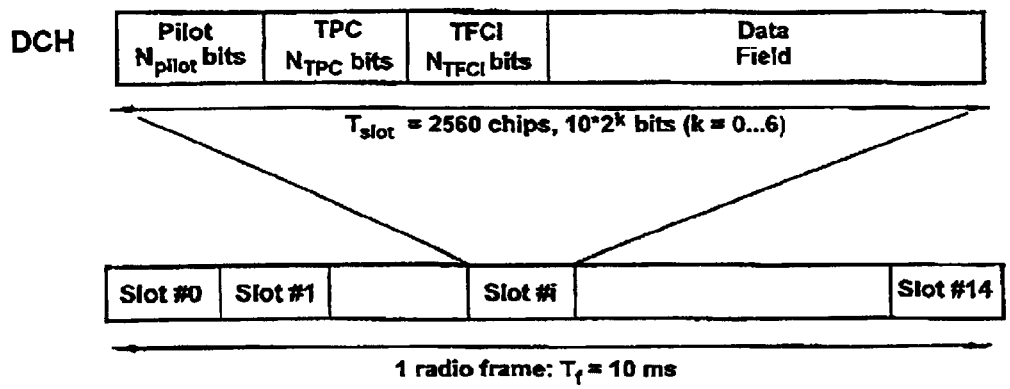

FIG. 1 shows the frame and slot structure of the low rate DCH that contains pilot bits for coherent detection, TPC (Transmit Power Control) bit for power control, TFCI (Transport Format Control Indicator) to indicate the transport format and a data field.

As indicated in the Figure, a time slot contains 2.560 chips and 15 slots #0 to #14 form a complete frame having a duration of 10 ms.

Figure 2:
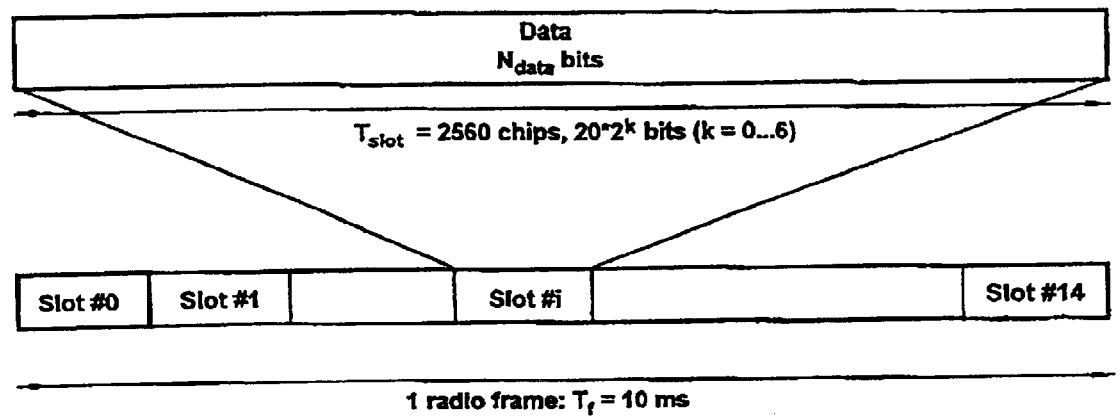
FIG. 2 shows a frame and slot structure of a DSCH frame to which the present invention may be applied.

FIG. 2 shows the frame and slot structure of the DSCH which only contains data. The DSCH can transmit variable data rates whereas different spreading factors (SF) are applied (k=0 . . . 6 relates to SF=256 . . . 4). The TFCI information on the DSCH includes information about the spreading factor, the data rate and channelisation code of the DSCH.

Figure 3:
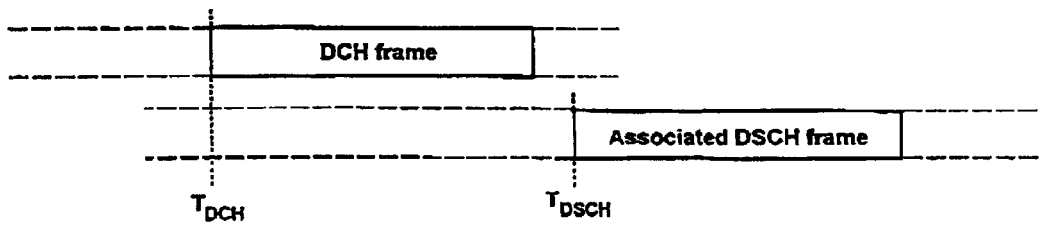
FIG. 3 shows the time relation between the DCH frame and the associated DSCH frame.

FIG. 3 shows the timing relation of the DSCH with one mobile station (with a low rate DCH) that might get data on the DSCH when there is data to transmit to that user. The timing of the DSCH is known since it is synchronous to other common channels. The high rate channel (DSCH) will only be allocated on demand and is shared by several users. So the data on the DSCH only needs to be decoded if there is data indicated by TFCI. The continuous DCH can, at the same time, be used to transport other data (e.g. circuit switched or other delay constrained data) or signalling data. DSCH and DCH operate in an asynchronous manner as different DCH have different timing to each other, but the relative timing is known to the mobile station and the data can be decoded correctly.

According to one aspect of the invention the PDU sequence numbers will be send on a separate physical channel. In the preferred embodiment the SNs are send together with the allocation message to minimise the signalling overhead needed for the packet transmission and the incremental redundancy scheme.

For CMDA communications systems this implies that the channel where the signalling data is mapped onto is spread with a different channelisation codes before the signal is modulated. This allows that the QoS by this channel is controlled separately from the channel where the PDUs are send. For instance the power level of the DCH can be increased to improve the reception of the SNs. In future mobile communication systems such as UMTS it is also possible to transmit certain fields with different power. For instance the power of the DCH data field can be different from the TFCI, TPC or pilot power. The separation of control and user data provides additional flexibility. Some systems are therefore also using separate protocol stacks for control and user plane of the ISO (International Standardisation Organisation) OSI (Open System Interconnection) protocol stack. A benefit of separating control information from data is that the signalling can be combined with other signalling thus providing more efficient transmission. To send the SNs over a different physical channel can also mean to send them in a different slot (e.g. TDMA) or on a different frequency (e.g. FDMA, OFDM).

In prior art systems the sequence numbers are send together with the PDU for unambiguous assignment and minimal delay. Typically a strong block code is used to encode single sequence numbers since only a couple of bits have to be encoded. New packet data applications allow for some delay that have not been acceptable for traditional circuit switched applications (e.g. speech). In the preferred embodiment the DCH frame that contains the allocation message (TFCI) for the shared channel also delivers the SNs for the PDUs to be transmitted in the corresponding DSCH frame. With the combination of these two methods the signalling overhead of the shared channel concept and incremental redundancy is minimised using the channel together. By this combination also the newly introduced delay is kept at a minimum because the allocation message is needed in any case if a high rate channel is shared by multiple users. Simulations have shown that the delay for packet data can even be reduced compared to a circuit switched connection since the 'big pipe' that is shared by multiple users is a more appropriate transmission scheme for applications where data does not arrive continuously. The time difference between allocation message and the data packets has to be kept very small since in a mobile communication environment the conditions can change quite frequently.

Figure 4:
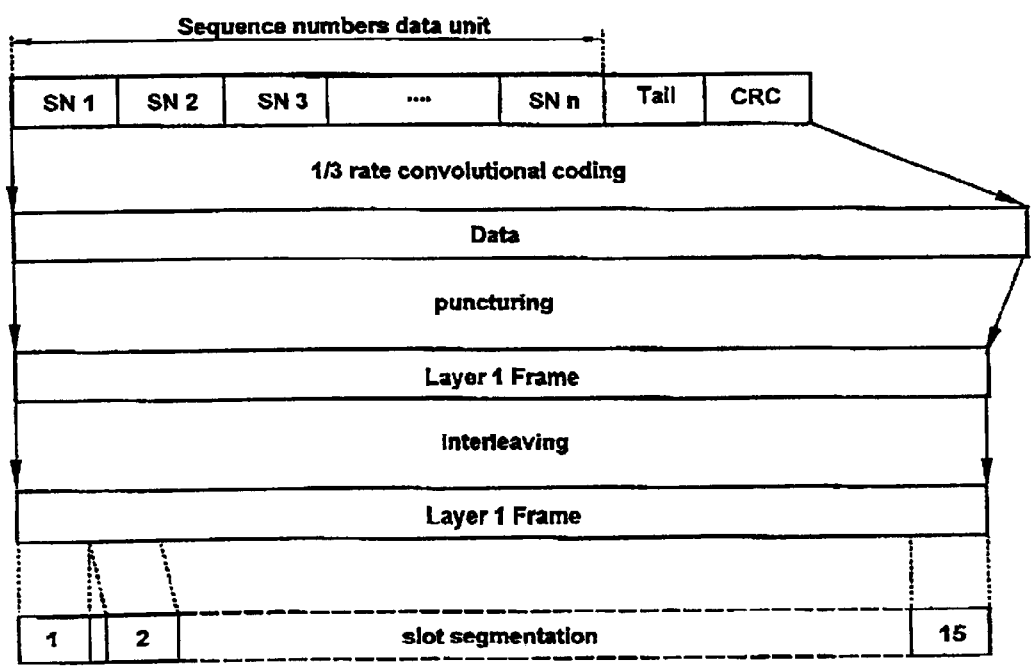
FIG. 4 shows the DCH frame data structure to be multiplexed on a 10 ms frame.

The sequence numbers will be delivered as higher layer signalling message in the data field of the DCH. Since the shared channels are only used for higher data rates it is possible to combine them for reliable encoding and to use more suitable codes such as convolutional or turbo codes. In the following the packet with the SNs shall be called Sequence numbers data unit—SNDU. FIG. 4 shows the most simple arrangement of SNs. Sequence numbers for all the packets in the next DSCH frame are arranged in order and encoded by a $\frac{1}{3}$ rate convolutional encoder. Before encoding 8 bits for code termination are attached as a tail to the SNs. Other coding methods as Turbo or BCH encoding could also be used. To ensure reliable reception the data field is protected by a CRC code that can have a variable size of 8, 12, 16 or 24 bit. The number of PDUs in the DSCH frame and consequently the number of SN in the DCH frame that are transmitted can vary from 1 up to more than 100 depending on the PDU size and the chosen data rate of the DSCH. After encoding puncturing or repetition is applied to map the data onto the physical channel. Before slot segmentation the data is interleaved over a frame (10 ms). Of course, it should be understood that this processing of coding and multiplexing is just given as a simplified example embodiment of the invention.

It is also possible that the SNDU is multiplexed together with other signalling data with user data on the DCH. A major advantage of the scheme proposed is that it is possible to group multiple SNs together. ARQ protocols are usually using a sliding window technique. That means that except the retransmissions, that are often send with higher priority, all packets are send in order. Different arrangements of the SNs can be used to compress the actual information in the SNDU that is send over the air interface. For example they do not have to be send as a list each SN having around 6 to 12 bits. Instead they could be send in series, e.g. 1–4 or 1+3, 7–12 or 7+5 instead of 1,2,3,4,7,8,9,10,11,12.

For a high rate shared channel that transmits several PDUs per frame it will be difficult to put the SNDU into a single frame while maintaining the high spreading factor (e.g. 256, 512). A decrease of the spreading factor should be avoided to minimise the resources allocated in idle times. It should therefore be possible to map the SNDU onto more than one frame. The time offset between the DCH and the DSCH should take the maximum number of frames per SNDU into account. The interleaving size can also be increased to multiple frames or remains on a frame basis to make the SNs available as soon as possible. SNs could also be send on multiple SNDU to avoid large packet losses if a SNDU is corrupted.

An example shall be given in the following. The SNDU is mapped to two frames, whereas interleaving is only done over 10 ms. The DCH/DSCH offset is defined to a minimum of one frame. That means that the SNDU first frame is received before the corresponding DSCH frame, while the second is received simultaneously.

The retransmission window size and consequently the number of bits required for the sequence number should also be kept as small as possible to reduce the signalling overhead per PDU. A small window size requires that the round trip delay is as small as possible to speed up the retransmissions and acknowledge process.

The SNs in the DCH data field easily identify whether incremental redundancy is used or not before the PDUs are received. By this once again receiver complexity is decreased since the reconfiguration of the receiver can be done before the reception of the PDUs. Incremental redundancy can easily be switched on/off by the proposed method, e.g. when the receiver runs out of memory.

The sequence numbers identify which PDUs shall be combined with each other. For a correct operation it is therefore essential that the sequence numbers are correct.

The CRC will provide an effective means to ensure that the SNDU is received correctly. Nevertheless means have to be provided in the protocol to resolve sequence number errors that are not detected. A high FEC encoding will ensure that the SNDU is received correctly even when some or all PDUs are erroneous. There is a trade-off in reliability and coding overhead. It might be more efficient to take regular failures into account instead of encoding data too reliable. A recognised problem is if the SNDU gets lost all the PDUs of the corresponding frame are send on the DSCH Seven though they can not be identified.

A variant of the invention is that the mobile station will send an indicator on the uplink DCH to the base station after the correct reception of a SNDU. Only when this indicator is received by the base station the PDUs are send on the DSCH. If the indicator is not received, the PDUs will not be send and interference will be minimised.

For hybrid ARQ Type III each PDU is self-decodable, meaning that they can theoretically be decoded without any combining with previous PDUs. Enough information is provided in each PDU to decode it without combining. For such schemes a different approach has been found beneficial. The SNDU is also delivered on a separate channel but is not very strongly encoded. At the same time, the sequence number is additionally transmitted as part of the header in the PDU, as in usual operation. The header is included in the RLC layer. If the SNDU is received correctly, the reception can be improved by PDU combining. If the SNDU is lost the PDUs can still be decoded without combining (if reception quality allows) because the sequence number in the PDU header identifies the PDU for the RLC layer. By this the coding overhead for SNDUs is decreased and the protocol can still work efficiently if the SNDU is lost. There are other advantages of this approach since it is possible to separate the RLC retransmission protocol completely from the recombining process in the physical layer. If it is intended not to use SNDU transmission, the RLC layer protocol is exactly the same as without Hybrid ARQ Type III. This allows to switch the combining operation off without any impact on RLC protocol, the PDU structure or the DSCH transmission in general. The drawback is that there is redundant information in the PDU header sent in cases where the SNDU is received correctly.

Figure 5:
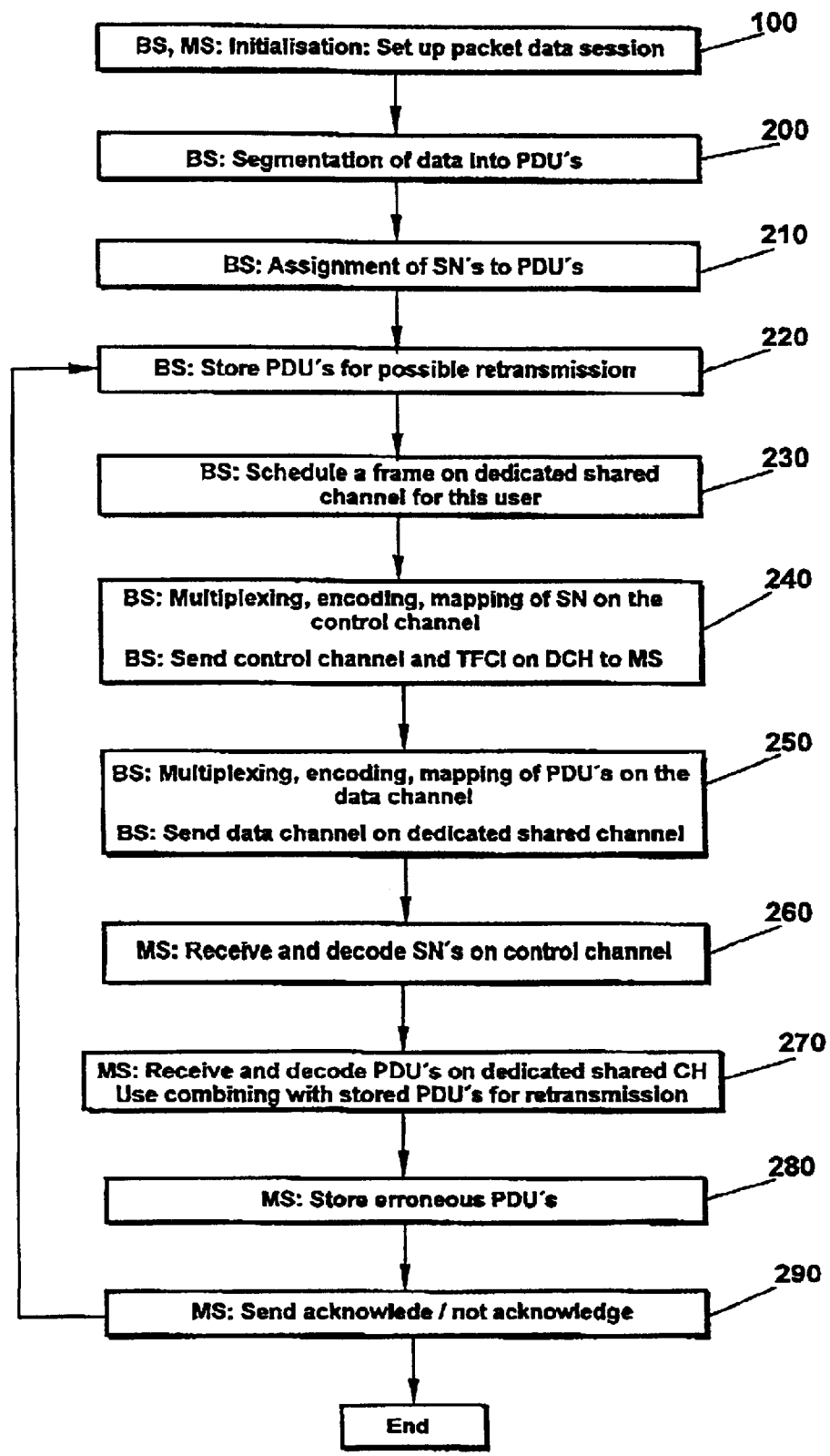
FIG. 5 shows a flow chart explaining the principles of the present invention.

In the following a preferred embodiment of the method of the invention is explained with reference to FIG. 5.

When a mobile station sets up a packet data session in step 100 (e.g. Internet access) the Base Station can decide, depending on the application, to use the DSCH for that user. A dedicated channel is established in up- and downlink. A transport format control indicator TFCI which defines the possible data rates on the DSCH is allocated by the base station and signalled to the mobile station.

If there are packets arriving at the base station the data will be segmented in step 200 into PDUs. Now, the SNs are assigned to the PDUs (step 210), before they are stored according to step 220 for possible retransmission. Once enough PDUs are accumulated to be sent on the DSCH, the base station will schedule a frame on the DSCH for this user (step 230). The sequence numbers will be multiplexed, encoded according to FIG. 4 and mapped on the control channel as shown in the Figure in step 240. Subsequently the base station transmits the control channel including the TFCI on the DCH to the mobile station. In step 250 the PDUs are multiplexed, encoded and mapped on the data channel which is sent on the DSCH. With the specified timing (see FIG. 3) the mobile station receives the DCH and hence will be informed via TFCI (step 230) on the DCH (signal is spread with spreading code x) about the data to be decoded on the DSCH (signal is spread with spreading code y) and its transport format. In the same DCH frame (or the following frames if mapped to several frames) the sequence numbers will be signalled to and decoded by the mobile station (step 260). The mobile station hence knows exactly the beginning of the DSCH frame and will receive and decode the PDUs on the DSCH (step 270) sent in step 250.

The storage of erroneous PDUs (step 280) and the combining with retransmissions (step 270) will take place according to an implemented algorithm that is out of scope of this description. All correctly decoded packets are transmitted to the higher layers. Not successfully decoded packet will be stored for recombining with retransmissions.

Acknowledge (ACK) and Not-Acknowledge (NACK) messages (step 290) will be send to the transmitter according to the implemented RLC protocol.

The mobile station will wait for new packets to be transmitted as long as the session is ongoing (return to step 220) and the user is likely to use the DSCH.

For future systems it will be common that there are multiple logical channels mapped on the physical channel. A logical channel might consist of control data or user data and can belong to different applications or protocol entities. The multiplexing of the transport channel does not necessarily take place in the physical layer but is likely to be accomplished by the Medium Access Control (MAC) Layer. For incremental redundancy this higher layer multiplexing is problematic, because a transport block that is passed to the physical layer for transmission can consist of data from different logical channels. After decoding one of the blocks might be correctly received while the other is erroneous. A retransmission have to be done based on the originally sent data. The exact data block including the correctly received data part would have to be retransmitted to make the recombining process work. Some of the logical channels might not even use ARQ if they have a low QoS requirement.

Another characteristic of the present invention is to switch off the MAC multiplexing to make incremental redundancy more efficient. This can be done in connection with the decision to use incremental redundancy or not. This will ensure that if incremental redundancy is used different logical channel are passed as separate transport channels to the physical layer. In addition to the transport blocks for each transport channel, further information is given to the physical layer if incremental redundancy shall be used or not. Incremental redundancy is only possible for logical channels that apply ARQ (that are in acknowledged mode).

Which transport channel will use incremental redundancy will in the downlink also depend on the capabilities of the mobile terminal. The main limitation in the terminal will be lack of memory to store the soft-decision values. If the mobile terminal can not support incremental redundancy for all transport channels incremental redundancy can be switched off for some transport channels.

What is claimed is:

1. A hybrid ARQ method for packet data transmission in a mobile communication system wherein previously transmitted data packets are combined with retransmitted packets, said method comprising:

segmenting data packets into a plurality of protocol data units PDUs;

assigning a sequence number for each of the PDUs for identification purposes;

transmitting the sequence numbers on a control channel; and transmitting the PDUs on a data channel which is separate from the control channel on which the sequence numbers are transmitted.

2. The method of claim 1, wherein the data on the control channel for transmitting the sequence numbers is spread with a differentchannelization code than the data channel for transmitting the 3. The method according to claim 1, wherein the control channel for transmitting the sequence numbers uses a different time slot than the data channel for transmitting the PDUs.

4. The method according to claim 1, wherein the control channel for transmitting the sequence numbers has a different frequency than the data channel for transmitting the PDUs.

5. The method according to claim 1, wherein the data channel for transmitting the PDUs is a channel shared by several users.

6. The method according to claim 1, wherein the control channel for transmitting the sequence numbers is a dedicated channel DCH or a shared control channel.

7. The method according to claim 1, wherein a quality of service QoS of the control channel for transmitting the sequence numbers is independent from a QoS of the data channel for transmitting the PDUs by suitably controlling at least one of the parameters including transmission power, coding rate and spreading factor.

8. The method according to claim 1, wherein a plurality of sequence numbers are combined in a sequence number data unit SNDU.

9. The method according to claim 8, wherein an order of the sequence numbers in the SNDU corresponds to an order of arriving PDUs.

10. The method according to claim 8, wherein the SNDU is encoded with a cyclic redundancy check CRC code.

11. The method according to claim 8, wherein the SNDU is multiplexed with other signalling data or user data.

12. The method according to claim 8, wherein the SNDU is sent together with an allocation message on the control channel for a shared uplink or downlink channel.

13. The method according to claim 8, wherein the SNDU sent on the control channel is time offset from the corresponding PDU on the data channel.

14. The method according to claim 8, wherein the SNDU is mapped to more than one frame of the control channel.

15. The method according to claim 8, wherein a correct reception of a SNDU is indicated from a mobile station to a base station or vice versa.

16. The method according to claim 8, wherein the SNDU is received before the corresponding PDUs arrive at a receiver.

17. The method according to claim 8, wherein packet combining is only used when the SNDU is received correctly.

18. The method according to claim 8, wherein packets are decoded without combining when the SNDU is not received correctly.

19. The method according to claim 8, wherein in case that the SNDU is not received correctly, information from the sequence number in a PDU header on the data channel is combined with the SNDU data from the control channel to decode the SNDU correctly.

20. The method according to claim 8, wherein the SNDU combines sequence numbers for transport channels using said hybrid ARQ method on a shared channel as well as sequence numbers for transport channels using said hybrid ARQ method on a dedicated channel.

21. The method according to claim 1, wherein the sequence number is included in a header of each PDU (type III ARQ).

22. The method according to claim 1, wherein a network control unit transmits a signal to at least one of a base station and a mobile station indicating whether said hybrid ARQ method is to be employed or not.

23. The method according to claim 1, wherein a mobile station transmits a signal to a base station or vice versa indicating whether said hybrid ARQ method shall be employed or not.

24. The method according to claim 1, wherein at least one of a base station and a mobile station recognizes, from an existence of a SDNU, whether said hybrid ARQ method is to be employed or not.

25. The method according to claim 1, wherein the control channel for transmitting the sequence numbers is coded with a lower coding rate compared to the data channel for transmitting the PDUs.

26. The method according to claim 1, further comprising:

correlating sequence numbers received from the control channel with corresponding PDUs received from the data channel based upon an allocation message TFCI transmitted on the control channel and a time offset between the control channel and the data channel.

* * * * *